(12) United States Patent
Kano et al.

(10) Patent No.: US 8,210,328 B2
(45) Date of Patent: Jul. 3, 2012

(54) DISC ROTOR

(75) Inventors: Masatoshi Kano, Toyota (JP); Kunio Ishihara, Toyota (JP); Haruhisa Baba, Toyota (JP); Keisuke Seto, Nishikamo-gun (JP); Hitoshi Ikeuchi, Toyota (JP); Yoichi Kato, Toyota (JP)

(73) Assignees: Advics Co., Ltd., Kariya, Aichi-Pref. (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 443 days.

(21) Appl. No.: 12/606,907

(22) Filed: Oct. 27, 2009

(65) Prior Publication Data

US 2010/0101902 A1 Apr. 29, 2010

(30) Foreign Application Priority Data

Oct. 29, 2008 (JP) ................................. 2008-278154

(51) Int. Cl.
*F16D 65/12* (2006.01)
(52) U.S. Cl. ................................. 188/218 XL
(58) Field of Classification Search .............. 188/205 R, 188/206 A, 205 A, 218 XL
See application file for complete search history.

(56) References Cited

U.S. PATENT DOCUMENTS

| | | | |
|---|---|---|---|
| 4,645,041 A | | 2/1987 | Bass |
| 4,848,521 A | * | 7/1989 | Izumine ...................... 188/18 A |
| 5,520,269 A | * | 5/1996 | Yamamoto et al. ..... 188/218 XL |
| 6,604,613 B2 | * | 8/2003 | Burgoon et al. ........ 188/218 XL |
| 7,416,060 B2 | * | 8/2008 | Takizawa ................ 188/218 XL |
| 2004/0182660 A1 | | 9/2004 | Cavagna et al. |

FOREIGN PATENT DOCUMENTS

| | | |
|---|---|---|
| JP | 05-073329 U | 10/1993 |
| JP | 06-076727 U | 10/1994 |
| JP | 08-312700 A | 11/1996 |
| JP | 09-166168 A | 6/1997 |
| JP | 2002-227891 A | 8/2002 |
| JP | 2004-530848 A | 10/2004 |
| JP | 2006-336670 A | 12/2006 |
| JP | 2008-111500 A | 5/2008 |

* cited by examiner

*Primary Examiner* — Christopher Schwartz
(74) *Attorney, Agent, or Firm* — Buchanan Ingersoll & Rooney PC (57) ABSTRACT

A disc rotor includes a sliding portion, a hat portion, and a connecting unit connecting the sliding portion and the hat portion. The connecting unit includes a washer arranged between the radially inner portion of the sliding portion and the radially outer portion of the hat portion, and a connecting pin having a head portion, having a shaft portion inserted through a first through-hole formed at the sliding portion, the washer and a second through-hole formed at the hat portion in an axial direction of the rotor, and riveted at an end portion of the shaft portion so as to integrally fasten the sliding portion, the washer and the hat portion. A riveted portion of the connecting pin is formed into a taper shape, and an outer circumferential surface of the riveted portion contacts and engages a tapered surface formed at the second through-hole of the hat portion.

2 Claims, 9 Drawing Sheets

DISC ROTOR

CROSS REFERENCE TO RELATED APPLICATIONS

This application is based on and claims priority under 35 U.S.C. §119 to Japanese Patent Application 2008-278154, filed on Oct. 29, 2008, the entire contents of which is incorporated herein by reference.

FIELD OF THE INVENTION

The present invention relates to a disc rotor of a disc brake apparatus for braking wheels of a vehicle and the like.

BACKGROUND

A disc rotor is known which includes a sliding portion, a hat portion and connecting units. The sliding portion, formed into a substantially ring-shape, is sandwiched between friction pads at the time of a braking operation. The hat portion is made of a metal material (an aluminum alloy) that is softer than a metal material (an iron-series material), of which the sliding portion 11 is made. The hat portion is connected to a radially inner portion of the sliding portion at a radially outer portion thereof. The hat portion includes an inner flange portion, at which the hat portion is fixed to a wheel hub. Each of the connecting units is arranged at a connecting portion of the sliding portion and the hat portion so as to integrally connect the sliding portion and the hat portion.

According to JP2004-530848T, each of the connecting units includes a sheet-shaped insert, a block-shaped drive element, a flat spring and a screw. The insert is accommodated in a radial recess formed at a radially outer portion of the hat portion (corresponding to a bell in JP2004-530848T). The flat spring is attached to an end of the drive element facing the hat portion. The screw is inserted through a radially inner portion of the sliding portion (corresponding to a braking band in JP2004-530848T), the drive element, and the flat spring in the radial direction of the rotor, so that the sliding portion, the drive element and the flat spring are fastened by means of a nut and the screw.

According to the above-described connecting units in JP2004-530848T, although a desired level of strength may be obtained, assembly may not be easy since each of the connecting units includes multiple members (five members): the insert, the drive element, the flat spring, the screw, the nut and the like. Further, according to the above-described connecting units, the inserts are made of a wear-resistant sheet metal, such as spring steel and the like, which is a dissimilar metal from the material of the hat portion (an aluminum alloy). In a state where the inserts are arranged at the corresponding radial recesses of the hat portion (i.e. in a state where the inserts are not yet screwed into the radial recess of the hat portion by means of the nuts and the bolts), a gap may be formed (i.e. a gap for easy assembly of the inserts to the hat portion) between the inserts and the hat portion in the axial, radial and circumferential directions of the rotor. Even after the inserts have been screwed into the hat portion by means of the nuts and the bolts, the gap remains between the inserts and the hat portion in the radial and circumferential direction of the rotor. As a consequence, ingress of liquid may occur, which may result in bimetallic corrosion (galvanic corrosion). Furthermore, according to the above-described connecting units, the nuts and end portions of the screws protrude from the radially outer portion of the hat portion in the axial direction of the rotor. Therefore, a length of the connecting units increases in the axial direction of the rotor, and a room necessary to assemble the connecting units increases.

A need thus exists for a disc rotor that is not susceptible to the drawback mentioned above.

SUMMARY OF THE INVENTION

According to an aspect of the present invention, a disc rotor includes a sliding portion formed into a ring shape and made of a metal material, a hat portion made of a metal material softer than the metal material of the sliding portion, and connected to a radially inner portion of the sliding portion at a radially outer portion of the hat portion, and a connecting unit arranged at a connecting portion of the sliding portion and the hat portion and integrally connecting the sliding portion and the hat portion. The connecting unit includes a washer formed into a ring shape, made of a metal material harder than the metal material of the hat portion, and arranged between the radially inner portion of the eliding portion and the radially outer portion of the hat portion, a connecting pin made of a metal material harder than the metal material of the hat portion, having a head portion engaged with the sliding portion, having a shaft portion inserted through a first through-hole formed at the sliding portion, through the washer and through a second through-hole formed at the hat portion in an axial direction of the rotor, and riveted at an end portion of the shaft portion so as to integrally fasten the sliding portion, the washer and the hat portion. A riveted portion of the connecting pin is formed into a taper shape, and an outer circumferential surface of the riveted portion contacts and engages a tapered surface formed at the second through-hole of the hat portion.

BRIEF DESCRIPTION OF THE DRAWINGS

The foregoing and additional features and characteristics of the present invention will become more apparent from the following detailed description considered with the reference to the accompanying drawings, wherein:

FIG. 6 is a cross-sectional view taken along line V-V in FIG. 4 illustrating only the sliding portion shown in FIG. 4;

DETAILED DESCRIPTION

First Embodiment

A first embodiment of a disc rotor A will be described hereinafter with reference to the attached drawings. FIGS. 1 to 7 illustrate the disc rotor A according to the first embodiment. The disc rotor A is mounted on a disc brake apparatus for braking wheels of a vehicle. The disc rotor A includes a sliding portion 11, a hat portion 12 and eight connecting units 20 (the number of the connecting units 20 may be modified). The sliding portion is formed into a substantially ring shape. The hat portion 12 is connected to a radially inner portion of the sliding portion 11 at a radially outer portion thereof. The connecting units 20 are arranged at a connecting portion of the sliding portion 11 and the hat portion 12 so as to integrally connect the sliding portion 11 and the hat portion 12.

The sliding portion 11 is made of cast iron (i.e. an iron-series metal material) as illustrated in FIGS. 1, 2, 4 and 5. The sliding portion 11 includes a substantially ring-shaped brake portion 11a at a radially outer portion thereof, and a substantially ring-shaped first inner flange portion 11b at the radially inner portion thereof. The brake portion 11a is sandwiched between friction pads at the time of braking operation. The sliding portion 11 is connected to the hat portion 12 at the first inner flange portion 11b.

The brake portion 11a includes plural air passages 11a1 at an inside thereof. The first inner flange portion 11b extends from a radially inner end of the brake portion 11a in a radially inner direction, at one side of the brake portion 11a (i.e. a left side in FIG. 5/an outer side of the vehicle). Eight first through-holes 11b1 are formed at the first inner flange portion 11b with the same interval therebetween in a circumferential direction of the rotor. Each of the first through-holes 11b1 is formed into an elongated circular shape, when seen in a front view, whose longitudinal direction corresponds to the radial direction of the rotor. Each of the first through-holes 11b1 extends through the first inner flange portion 11b in the axial direction of the rotor.

The hat portion 12 is made of aluminum alloy (i.e. a metal material softer than the material of the sliding portion 11). As illustrated in FIGS. 1, 2, 6 and 7, the hat portion 12 includes a second inner flange portion 12a at a radially inner portion thereof, an outer flange portion 12b at a radially outer portion thereof, and a cylindrical portion 12c at a radially intermediate portion thereof. The second inner flange portion 12a, formed into a substantially ring shape, is fixed to a wheel hub. The cylindrical portion 12c extends in the axial direction of the rotor.

Five attachment holes 12a1 are formed at the second inner flange portion 12a with the same interval therebetween in the circumferential direction of the rotor, in order to fix the hat portion 12 to the wheel hub. Eight thick portions (a thickness of each of the thick portions is approximately 9 mm in the axial direction of the rotor) and eight thin portions are formed at the outer flange portion 12b so that each of the thick portions and each of the thin portions are arranged next to each other with the same interval therebetween in the circumferential direction of the rotor. The thick portions are respectively formed with second through-holes 12b1. Each of the second through-holes 12b1 is formed into a substantially circular shape when seen in a front view. Each of the second through-holes 12b1 extends through the outer flange portion 12b in the axial direction of the rotor. Further, a tapered surface S is formed at one side (i.e. a left side in FIG. 7/the outer side of the vehicle) of each of the second through-holes 12b1. A tapered angle of the tapered surface S is set to be approximately 110 degrees, and a depth of the tapered surface S in the axial direction of the rotor is set to be approximately 2 mm. The "tapered angle" mentioned hereinafter corresponds to an angle formed between the tapered surface S and an inner circumferential surface of each of the second through-holes 12b1.

Figure 1:
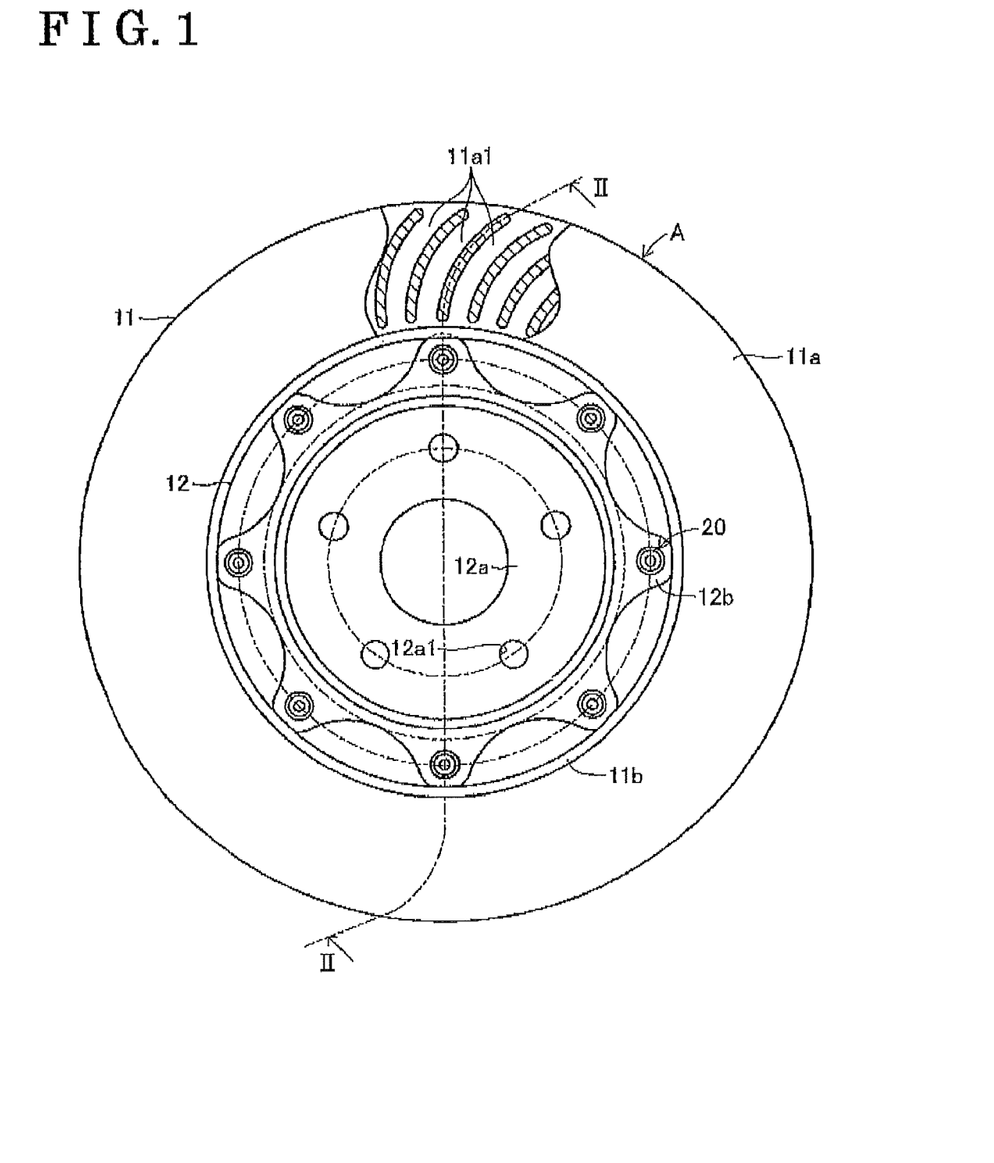
FIG. 1 is a partially cutout front view illustrating a disc rotor according to a first embodiment.
Figure 2:
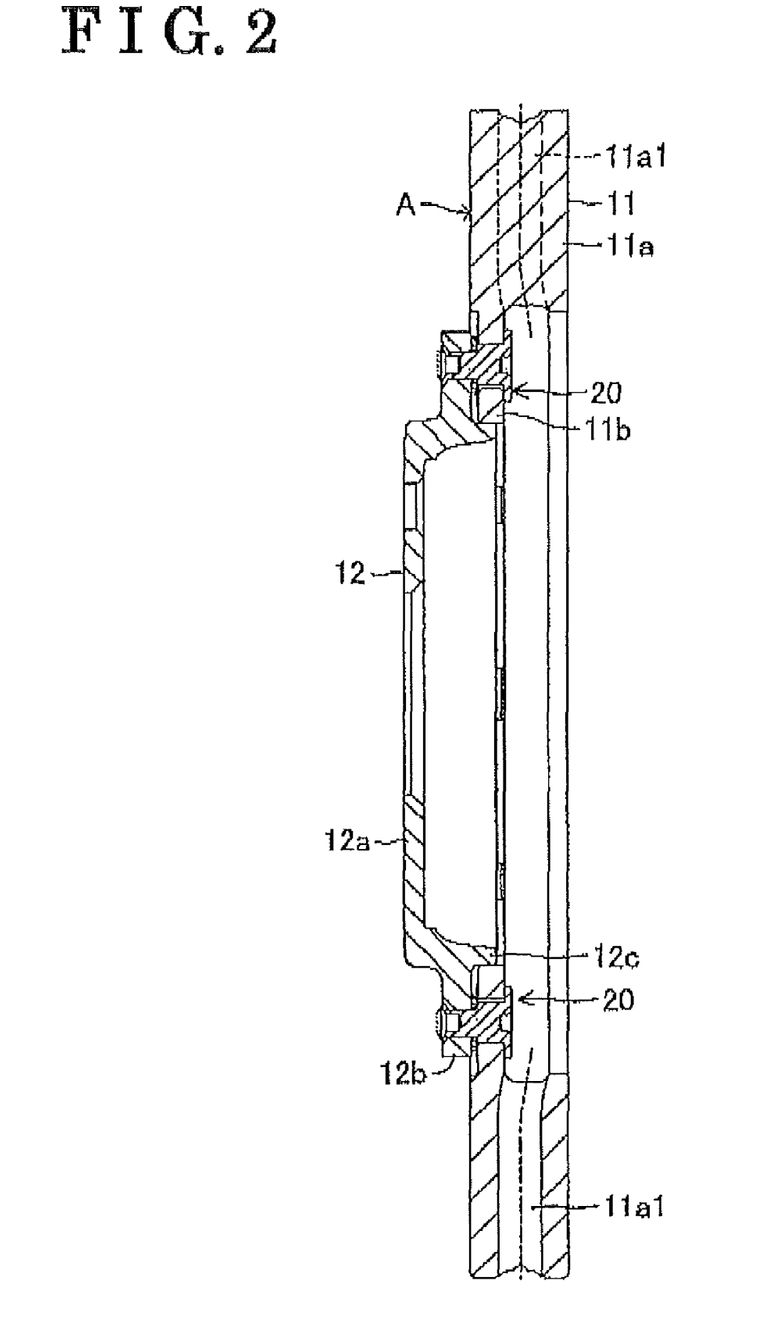
FIG. 2 is a cross-sectional view taken along line II-II in FIG. 1 illustrating the disc rotor shown in FIG. 1.

The cylindrical portion 12c is arranged at an inner side of the sliding portion 11 in the radial direction of the rotor, as illustrated in FIG. 2. An outer radius of the cylindrical portion 12c is set to be of substantially the same length to an inner radius of the sliding portion 11 so that the cylindrical portion 12c and the sliding portion 11 are engageable with each other when the hat portion 12 is assembled to the sliding portion 11. More specifically, the outer radius of the cylindrical portion 12c is set to be slightly smaller than the inner radius of the sliding portion 11 so that the cylindrical portion 12c and the sliding portion 11 are engaged to fit with each other. Accordingly, the hat portion 12 is easily assembled to the sliding portion 11 in a state where the hat portion 12 is coaxially engaged with the sliding portion 11 (an initial state).

Figure 3:
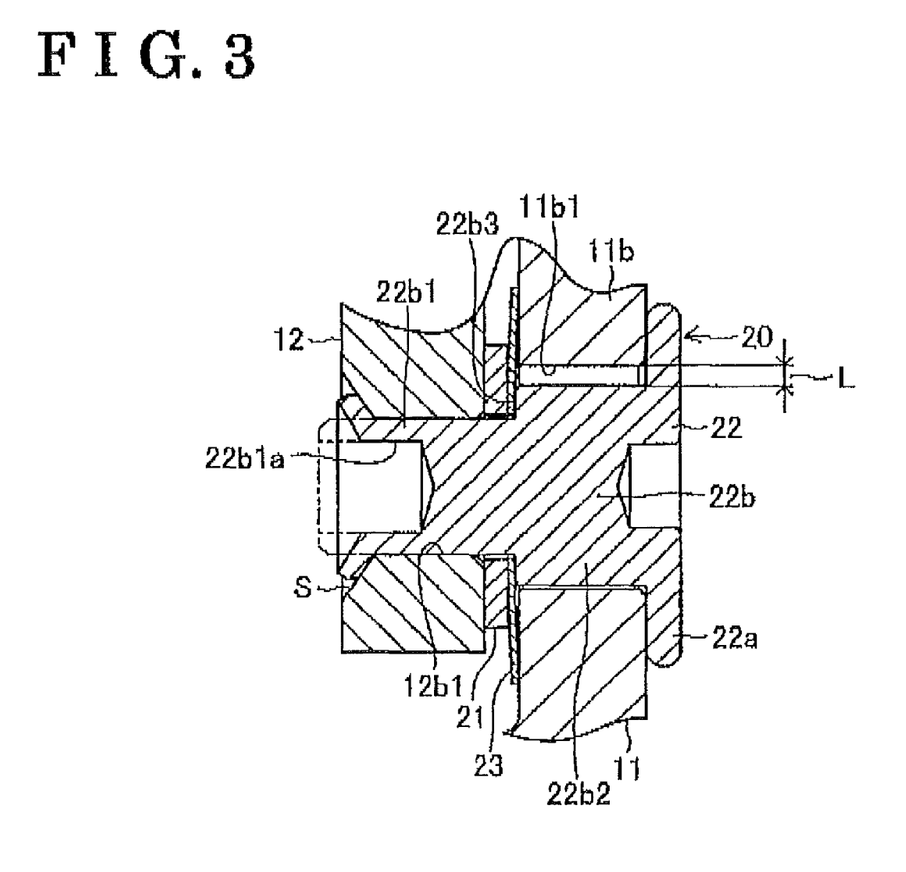
FIG. 3 is a partially enlarged cross-sectional view illustrating a connecting unit shown on a lower side of FIG. 2.
Figure 4:
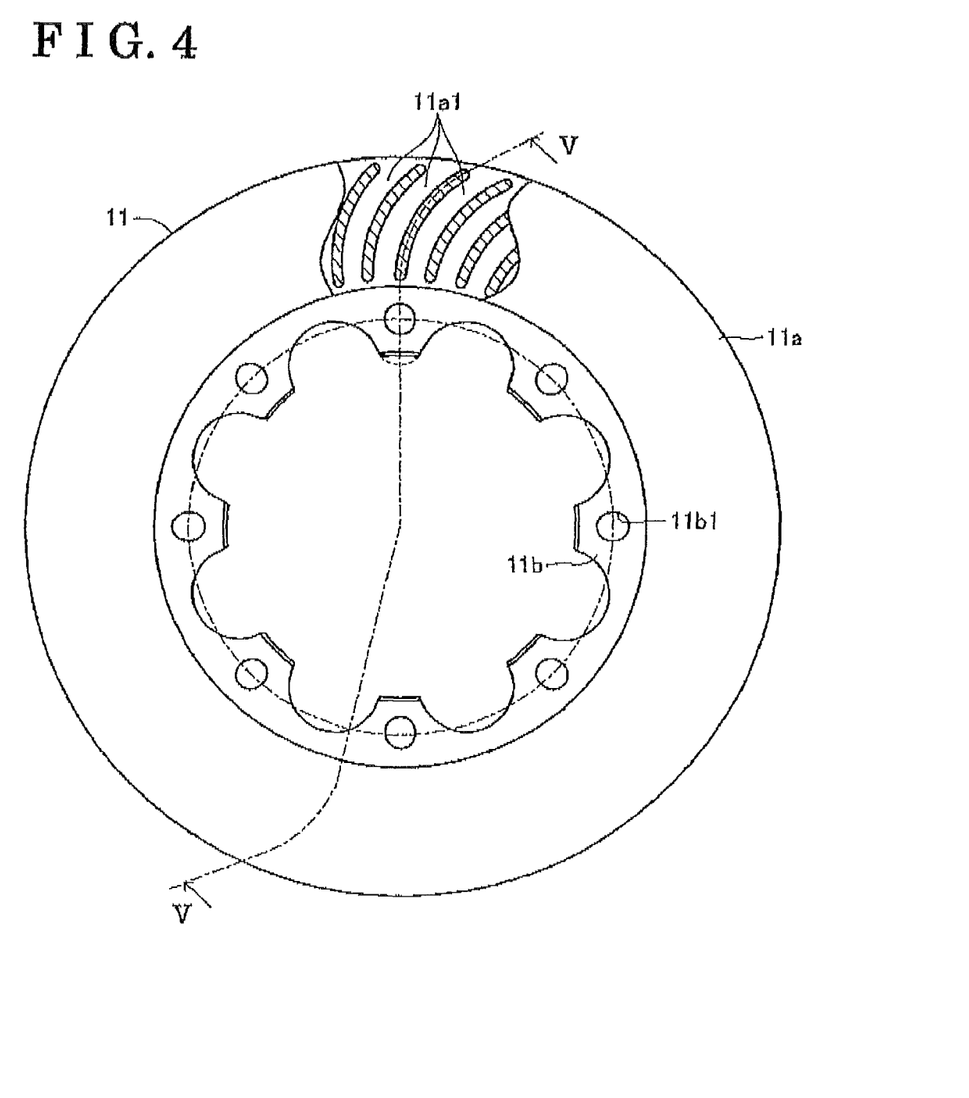
FIG. 4 is a partially cutout front view illustrating only a sliding portion of the disc rotor shown in FIGS. 1 and 2.
Figure 5:
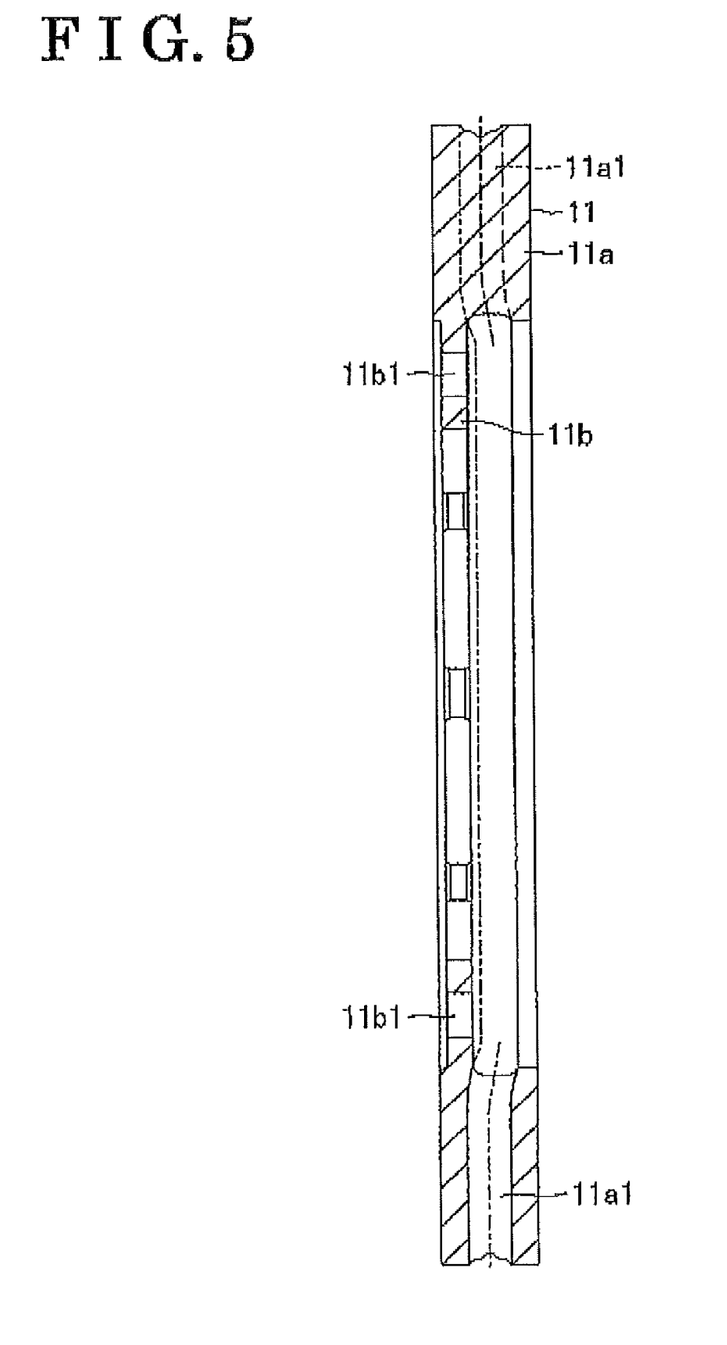
Figure 6:
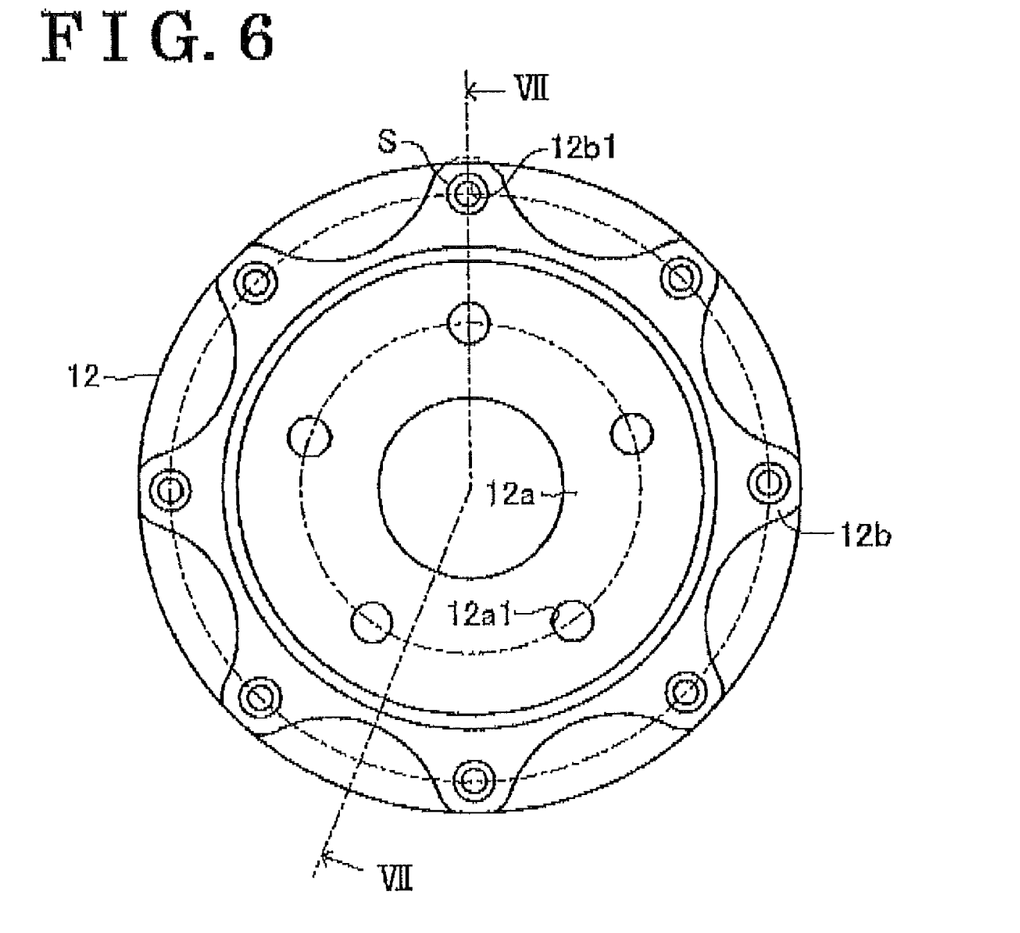
FIG. 6 is a partially cutout front view illustrating only a hat portion of the disc rotor shown in FIGS. 1 and 2.
Figure 7:
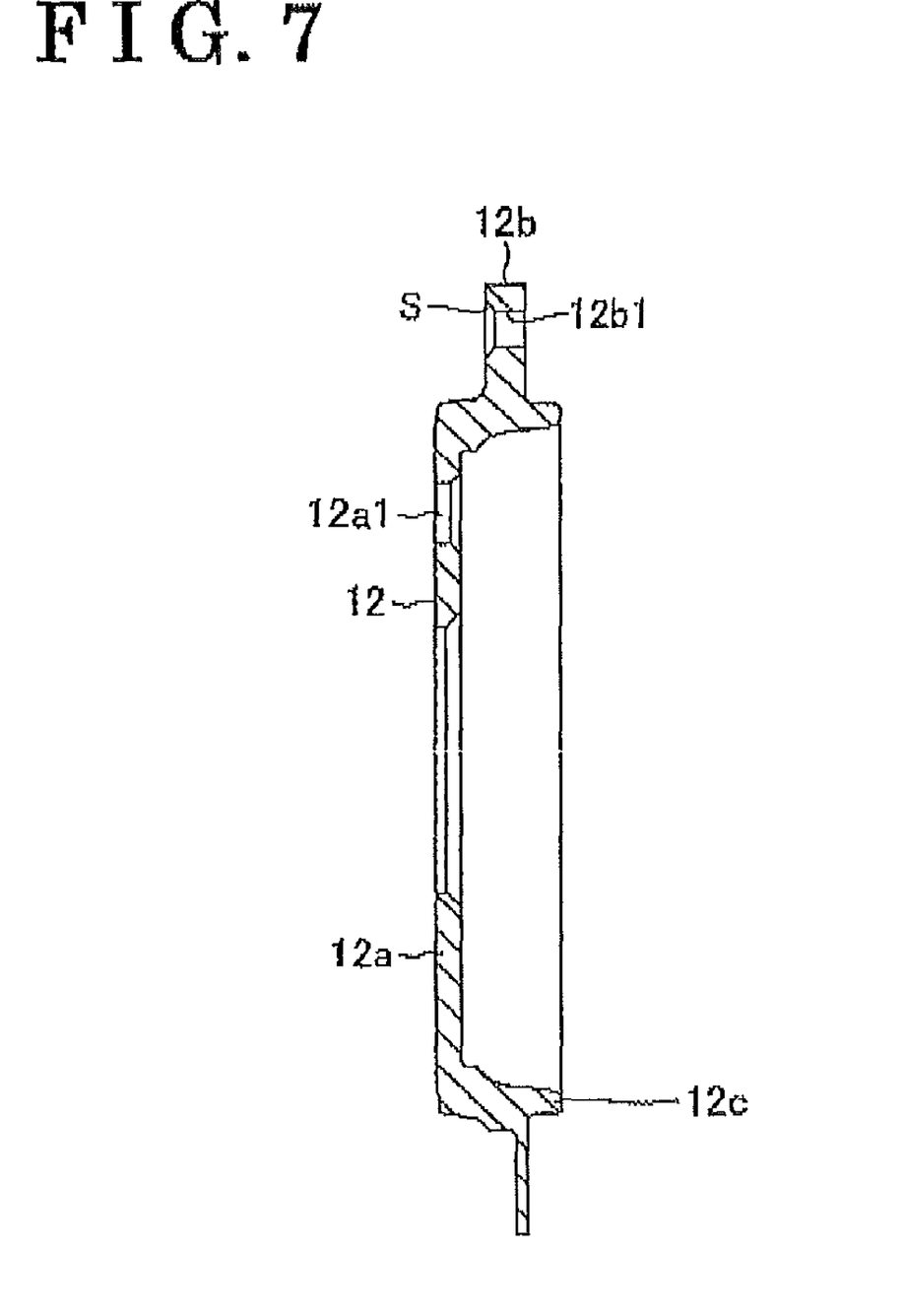
FIG. 7 is a cross-sectional view taken along line VII-VII in FIG. 6 illustrating only the hat portion shown in FIG. 6.

A structure and a function of each of the connecting units 20 are substantially the same. Therefore, only one of the plural connecting units 20 will be described mainly hereinafter. The connecting unit 20 includes three members: a washer 21, a connecting pin 22 and a plate spring 23 (a disc spring), as illustrated by an enlarged view in FIG. 3. The washer 21, formed into a substantially ring shape, is made of a stainless steel (i.e. a metal material harder than the metal material of the hat portion 12). The washer 21 is, as illustrated in FIGS. 2 and 3, arranged between a radially inner portion of the sliding portion 11 and a radially outer portion of the hat portion 12 together with the substantially ring-shaped plate spring 23 in a manner where one side of the washer 21 (i.e. a left side in FIG. 3) entirely contacts and engages the hat portion 12.

The connecting pin 22 is riveted at an end thereof facing the hat portion 12 by a predetermined amount so that the sliding portion 11, the plate spring 23, the washer 21 and the hat portion 12 are integrally fastened. The connecting pin 22 is made of stainless steel (i.e. a metal material harder than the metal material of hat portion 12). The connecting pin 22 includes a head portion 22a and a shaft portion 22b.

The head portion 22a of the connecting pin 22 is engaged with one side (i.e. a right side in FIG. 3) of the first inner flange portion 11b of the sliding portion 11. The shaft portion 22b of the connecting pin 22 is inserted through the first through-hole 11b1 of the sliding portion 11, the plate spring 23, the washer 21 and the second through-hole 12b1 of the hat portion 12. The shaft portion 22b includes a small-diameter portion 22b1 that faces the hat portion 12 and a large-diameter portion 22b2 that faces the sliding portion 11. Further, the shaft portion 22b is formed with a step portion 22b3 at an intermediate portion thereof between the small-diameter portion 22b1 and the large-diameter portion 22b2. The step portion 22b3 allows the sliding portion 11 to move in the axial direction of the rotor by a predetermined amount (i.e. a deformable degree of the plate spring 23).

The small-diameter portion 22b1 of the shaft portion 22 is inserted through the plate spring 23, the washer 21 and the second through-hole 12b1 of the hat portion 12. A recess 22b1a is formed at an end portion of the small-diameter portion 22b1, so that the end portion of the small-diameter portion 22b1 is formed into a substantially hollow-cylindrical shape, whose thickness is set to be 1.0 to 1.5 mm. Further, the hollow-cylindrically-shaped end portion is riveted by a predetermined amount (i.e. approximately 2 to 3 mm) to form a taper shape. An outer circumferential surface of the hollow-cylindrically-shaped end portion entirely contacts and engages the tapered surface S that is formed at the second through-hole 12b1 of the hat portion 12.

An outer radius of the large-diameter portion 22b2 of the shaft portion 22b of the connecting pin 22 is set to be of substantially the same as a radius of a short-diameter portion of the first through-hole 11*b*1 of the sliding portion 11. The large-diameter portion 22*b*2 of the shaft portion 22*b* of the connecting pin 22 is inserted through the first-through hole 11*b*1 of the sliding portion 11. Further, in the initial state, a clearance L is generated between the large-diameter portion 22*b*2 and the first through-hole 11*b*1 at a position close to the axis of the rotor (i.e. an upper side in FIG. 3) to extend in the radial direction of the rotor by a predetermined length. The washer 21 and the plate spring 23 are sandwiched between the step portion 22*b*3 and the hat portion 12 without including any clearance therebetween. The step portion 22*b*3 engages with the washer 21 at a radially inner portion of the washer 21 through a portion (a radially inner portion) of the plate spring 23.

The plate spring 23 is made of stainless spring steel and is formed into a substantially ring shape. The plate spring 23 is arranged between the sliding portion 11 and the washer 21 to be elastically deformable therebetween in the axial direction of the rotor. The radially inner portion of the plate spring 23 is sandwiched between the connecting pin 22 and the washer 21. Further, the radially outer portion of the plate spring 23 is elastically engaged with the sliding portion 11 at one side of the sliding portion 11 (i.e. a left side in FIG. 3). The plate spring 23 thrusts the sliding portion 11 toward the head portion 22*a* of the connecting pin 22 in the axial direction of the rotor.

According to such structured disc rotor A of the first embodiment, the connecting unit 20 includes three members: the washer 21, the connecting pin 22 and the plate spring 23. Since fewer components are required, assembly is executed easily and surely, and less cost is required. Further, according to the disc rotor A of the first embodiment, the hat portion 12 and the end portion (a riveted portion) of the shaft portion 22*b* of the connecting pin 22 contacts each other, and the hat portion 12 and the washer 21 contacts each other, with sufficient amount of dimensions (contacting dimensions) therebetween. It takes considerable amount of time for the contacting dimensions to corrode entirely. Therefore, corrosion resistance against bimetallic corrosion (galvanic corrosion) is improved.

According to the disc rotor A of the first embodiment, the end portion of the shaft portion 22*b* of the connecting pin 22 facing the hat portion 12 is riveted to contact and engage with the tapered surface S formed at the second through-hole 12*b*1 of the hat portion 12. Therefore, the connecting pin 22 hardly protrudes from the radially outer portion of the hat portion 12 in the axial direction of the rotor. Accordingly, a length of the connecting unit 20 is decreased in the axial direction of the rotor, and less room is required to assemble the connecting unit 20. Further, according to the disc rotor A of the first embodiment, since the washer 21 is arranged between the sliding portion 11 and the hat portion 12, the washer 21 and the hat portion 12 contact each other with a sufficient amount of the contacting dimension therebetween. Accordingly, a radius of the shaft portion 22*b* of the connecting pin 22 may be set to be smaller.

According to the disc rotor A of the first embodiment, the shaft portion 22*b* includes the step portion 22*b*3 at an intermediate portion of the shaft portion 22*b* between the small-diameter portion 22*b*1, facing the hat portion 12, and the large-diameter portion 22*b*2, facing the sliding portion 11. The step portion 22*b*3 allows the sliding portion 11 to move in the axial direction of the rotor by the predetermined amount (i.e. the deformable degree of the plate spring 23). The step portion 22*b*3 contacts the radially inner portion of the washer 21 through the plate spring 23, which is arranged between the sliding portion 11 and the washer 21 and which thrusts the sliding portion 11 toward the head portion 22*a* of the connecting pin 22 in the axial direction of the rotor.

Accordingly, sealing property between the hat portion 12 and the end portion (the riveted portion) of the shaft portion 22*b* of the connecting pin 22, and between the hat portion 12 and the washer 21 is improved so as not to allow ingress of liquid therebetween. Accordingly, bimetallic corrosion (galvanic corrosion) that is caused by intervention of liquid is less likely to occur. As a result, corrosion resistance relative to bimetallic corrosion (galvanic corrosion) is further improved. Further, according to the disc rotor A of the first embodiment, thermal deformation of the sliding portion 11 at the time of a braking operation may be absorbed by a movement of the sliding portion 11 in the in the axial direction of the rotor (i.e. by an elastic deformation of the plate spring 23). Accordingly, brake noise and partial abrasion caused by the thermal deformation may be reduced.

Figure 8:
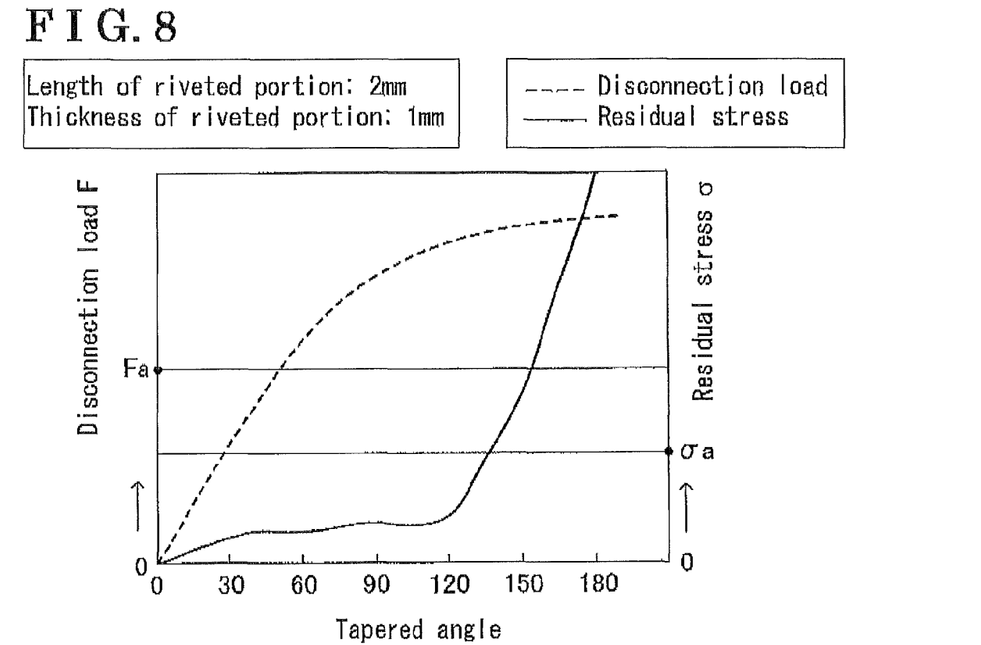
FIG. 8 is a diagram illustrating a relationship between a tapered angle and a disconnection force and a relationship between the tapered angle and a residua stress.
Figure 9:
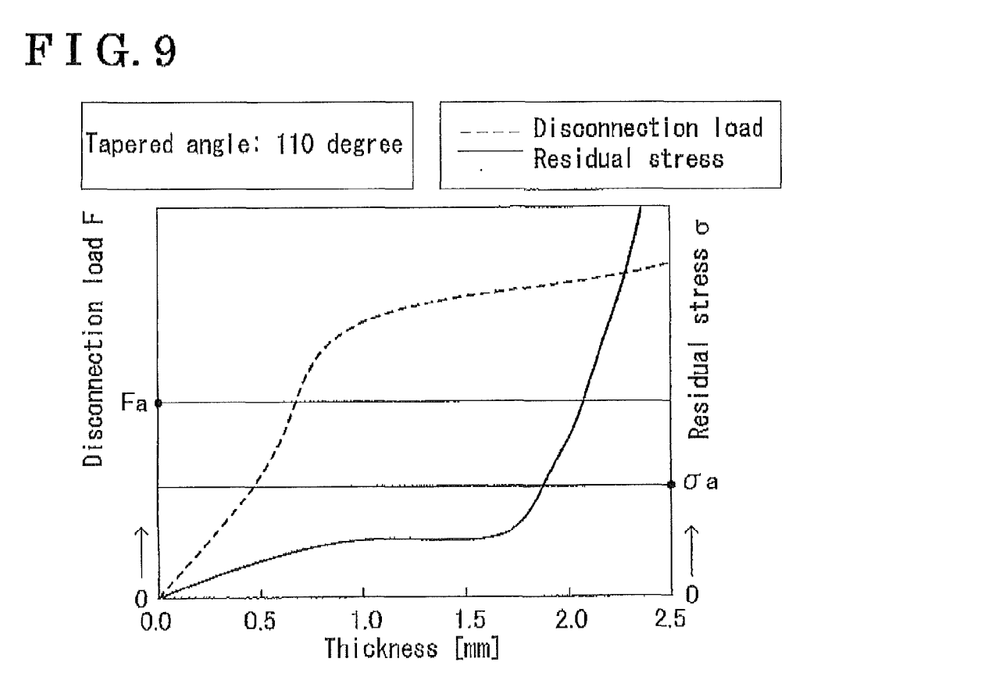
FIG. 9 is a diagram illustrating a relationship between a thickness of a riveted portion and the disconnection force and a relationship between the thickness of the riveted portion and the residual stress.

According to the disc rotor A of the first embodiment, the tapered angle of the tapered surface S is set to be approximately 110 degrees (a riveted angle of the riveted portion is set to be approximately 55 degrees), while the thickness of the riveted portion of the connecting pin 22 is set to be approximately 1.0 to 1.5 mm, and a length of the riveted portion in the axial direction is approximately 2 to 3 mm. Accordingly, as illustrated in FIGS. 8 and 9, a disconnection force F, by which the connecting pin 22 is disconnectable in the axial direction of the rotor, is set to be a predetermined value Fa or more, while residual stress $\sigma$, generated in the hat portion 12 due to swaging of the connecting pin 22, is set to be an allowable value $\sigma a$ or less. Accordingly, connecting strength between the sliding portion 11 and the hat portion 12 by means of the connecting pin 22 is secured, and resistance is improved against synergic action of bimetallic corrosion of the hat portion 12 and residual stress $\sigma$ (i.e. stress corrosion, in which corrosion progresses in a state where stress is applied). The tapered angle of the tapered surface S may be appropriately set within a range of 60 to 120 degrees (the riveted angle of the riveted portion is set within a range of 30 to 60 degrees).

According to the disc rotor A of the first embodiment, the outer radius of the cylindrical portion 12*c* of the hat portion 12 is set to be of substantially the same length of the inner radius of the sliding portion 11 so that the hat portion 12 and the sliding portion 11 are engageable with each other when the hat portion 12 and the sliding portion 11 are assembled together. Accordingly, the sliding portion 11 and the hat portion 12 are assembled together so as to engage with each other coaxially (i.e. the initial state). As a result, rotational balance is suitably maintained, and vibration at the time of rotation is reduced.

According to the disc rotor A of the first embodiment, when the sliding portion 11 is heated and the heating causes thermal expansion of the sliding portion 11 at the time of a braking operation, the sliding portion 11 is movable relative to the shaft portion 22*b* of the connecting pin 22 at the first through-hole 11*b*1 in the radially outer direction of the rotor (i.e. a lower direction in FIG. 3). Therefore, the sliding portion 11 may thermally expand smoothly in the radial direction of the rotor. Accordingly, there is less possibility of deformation of the sliding portion 11 in the axial direction of the rotor. Accordingly, brake noise and partial abrasion caused by the deformation is reduced. Further, when the sliding portion 11 is cooled down and the cooling down causes thermal contraction of the sliding portion 11 at the time of releasing braking operation, a returning position of the radially inner portion of the sliding portion 11 is specified by the cylinder portion 12*c*, which is formed at the hat portion 12, and therefore, the radially inner portion of the sliding portion 11 is positioned at the initial state.

According to the disc rotor A of the first embodiment, the sliding portion 11 and the hat portion 12 are assembled together so that the sliding portion 11 is movable relative to the connecting pin 22 in the axial direction of the rotor by a predetermined amount, and the plate spring 23, which is elastically deformable in the axial direction of the rotor, is arranged between the sliding portion 11 and the hat portion 12. Therefore, the sliding portion 11 is movable relative to the hat portion 12 in the axial direction of the rotor while elastically deforming the plate sprint 23. Accordingly, the thermally-expanding sliding portion 11 is less likely to be deformed in the axial direction of the rotor. As a result, brake noise and partial abrasion caused by the deformation is reduced.

According to the disc rotor A of the first embodiment, the first through-hole 11b1 is formed into an elongated circular shape whose longitudinal direction corresponds to the radial direction of the rotor (i.e. an elongated circular shape whose longer radius extends in the radial direction of the rotor). Further, the outer radius of the large-diameter portion 22b2 of the shaft portion 22b is set to be of substantially the same length as the radius of the short-diameter portion of the first through-hole 11b1 of the sliding portion 11. Therefore, the large-diameter portion 22b2 of the shaft portion 22b of the connecting pin 22 and the first through-hole 11b1 of the sliding portion 11 are engaged with each other so as to be movable only in the radial direction of the rotor. Accordingly, a movement of the sliding portion 11 relative to the hat portion 12 in the circumferential direction of the rotor is effectively restricted. On the other hand, the first through-hole (11b1) of the sliding portion 11 may be formed into a circular shape whose radius is larger than the radius of the large-diameter portion 22b2 of the shaft portion 22b of the connecting pin 22. In such case, compared to the first embodiment (i.e. the first through-hole 11b1 of the sliding portion 11 is formed into an enlarged circular shape whose longitudinal direction corresponds to the radial direction of the rotor), the first through-hole (11b1) of the sliding portion 11 is processed more easily. Accordingly, a cost is reduced.

Second Embodiment

Figure 10:
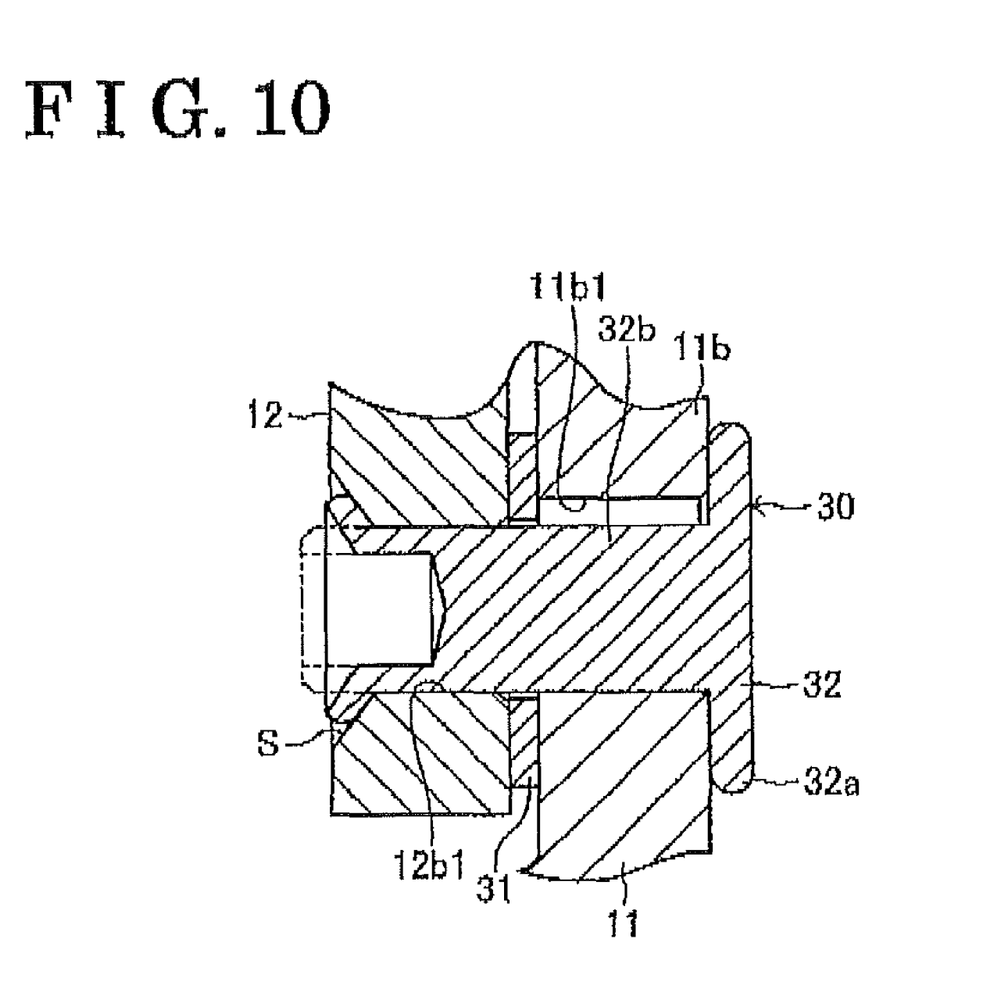
FIG. 10 is a partially enlarged cross-sectional view corresponding FIG. 3 illustrating a connecting unit of a disc rotor according to a second embodiment.

According to the above-described first embodiment, each of the connecting units 20 includes the three members: the washer 21, the connecting pin 22 and the plate spring 23. However, as a second embodiment is illustrated in FIG. 10, each connecting unit 30 may include two members: a washer 31 and a connecting pin 32. The connecting pin 32 is formed with a head portion 32a, but not formed with a step portion at a shaft portion 32b thereof. Further, the washer 31 is arranged between the sliding portion 11 and the hat portion 12. More specifically, the washer 31 is sandwiched between the sliding portion 11 and a portion of the connecting pin 32 riveted in a tapered manner. According to the second embodiment, effects similar to the first embodiment may be obtained, except for the effects related to the plate spring 23.

Accordingly, the connecting unit 20 includes three members: the washer 21, the connecting pin 22 and the plate spring 23. Since fewer components are required, assembly is executed easily and surely, and less cost is required. Further, according to the disc rotor A of the first embodiment, the hat portion 12 and the end portion (a riveted portion) of the shaft portion 22b of the connecting pin 22 contacts each other, and the hat portion 12 and the washer 21 contacts each other, with sufficient amount of dimensions (contacting dimensions) therebetween. It takes considerable amount of time for the contacting dimensions to corrode entirely. Therefore, corrosion resistance against bimetallic corrosion (galvanic corrosion) is improved. Further, the end portion of the shaft portion 22b of the connecting pin 22 facing the hat portion 12 is riveted to contact and engage with the tapered surface S formed at the second through-hole 12b1 of the hat portion 12. Therefore, the connecting pin 22 hardly protrudes from the radially outer portion of the hat portion 12 in the axial direction of the rotor. Accordingly, a length of the connecting unit 20 is decreased in the axial direction of the rotor, and less room is required to assemble the connecting unit 20. Further, according to the disc rotor A of the first embodiment, since the washer 21 is arranged between the sliding portion 11 and the hat portion 12, the washer 21 and the hat portion 12 contact each other with a sufficient amount of the contacting dimension therebetween. Accordingly, a radius of the shaft portion 22b of the connecting pin 22 may be set to be smaller.

According to the first and second embodiments, the shaft portion 22b of the connecting pin 22 includes a small-diameter portion 22b1 facing the hat portion 12, and a step portion 22b3 formed at an intermediate portion of the shaft portion 22b. The step portion 22b3 engages with a radially inner portion of the washer 21 via a portion of the plate spring 23 arranged between the sliding portion 11 and the washer 21 so as to thrust the sliding portion 11 toward the head portion 22a of the connecting pin 22 in the axial direction of the rotor.

Accordingly, sealing property between the hat portion 12 and the end portion (the riveted portion) of the shaft portion 22b of the connecting pin 22, and between the hat portion 12 and the washer 21 is improved so as not to allow ingress of liquid therebetween. Accordingly, bimetallic corrosion (galvanic corrosion) that is caused by intervention of liquid is less likely to occur. As a result, corrosion resistance relative to bimetallic corrosion (galvanic corrosion) is further improved.

Further, according to the disc rotor A of the first embodiment, thermal deformation of the sliding portion 11 at the time of a braking operation may be absorbed by a movement of the sliding portion 11 in the in axial direction of the rotor (i.e. by an elastic deformation of the plate spring 23). Accordingly, brake noise and partial abrasion caused by the thermal deformation may be reduced. Further, the connecting unit 20 includes three members: the washer 21, the connecting pin 22 and the plate spring 23. Since fewer components are required, assembly is executed easily and surely, and less cost is required.

Furthermore, the tapered angle of the tapered surface S is set to be approximately 110 degrees (a riveted angle of the riveted portion is set to be approximately 55 degrees), while the thickness of the riveted portion of the connecting pin 22 is set to be approximately 1.0 to 1.5 mm, and a length of the riveted portion in the axial direction is approximately 2 to 3 mm. Accordingly, a disconnection force F, by which the connecting pin 22 is disconnectable in the axial direction of the rotor, is set to be a predetermined value Fa or more, while residual stress σ, generated in the hat portion 12 due to swaging of the connecting pin 22, is set to be an allowable value σa or less. Accordingly, connecting strength between the sliding portion 11 and the hat portion 12 by means of the connecting pin 22 is secured, and resistance is improved against synergic action of bimetallic corrosion of the hat portion 12 and residual stress σ (i.e. stress corrosion, in which corrosion progresses in a state where stress is applied).

The principles, preferred embodiment and mode of operation of the present invention have been described in the foregoing specification. However, the invention, which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents, which fall within the spirit and scope of the present invention as defined in the claims, be embraced thereby.

The invention claimed is:

1. A disc rotor comprising:
a sliding portion formed into a ring shape and made of a metal material;
a hat portion made of a metal material softer than the metal material of the sliding portion, and connected to a radially inner portion of the sliding portion at a radially outer portion of the hat portion; and
a connecting unit arranged at a connecting portion of the sliding portion and the hat portion and integrally connecting the sliding portion and the hat portion, wherein
the connecting unit includes:
a washer formed into a ring shape, made of a metal material harder than the metal material of the hat portion, and arranged between the radially inner portion of the sliding portion and the radially outer portion of the hat portion; and
a connecting pin made of a metal material harder than the metal material of the hat portion, having a head portion engaged with the sliding portion, having a shaft portion inserted through a first through-hole formed at the sliding portion, through the washer and through a second through-hole formed at the hat portion in an axial direction of the rotor, and riveted at an end portion of the shaft portion so as to integrally fasten the sliding portion, the washer and the hat portion, and wherein
a riveted portion of the connecting pin is formed into a taper shape, and an outer circumferential surface of the riveted portion contacts and engages a tapered surface formed at the second through-hole of the hat portion.

2. The disc rotor according to claim 1, wherein
the shaft portion of the connecting pin includes a small-diameter portion facing the hat portion, and a step portion formed at an intermediate portion of the shaft portion, and wherein
the step portion engages with a radially inner portion of the washer via a portion of the plate spring arranged between the sliding portion and the washer so as to thrust the sliding portion toward the head portion of the connecting pin in the axial direction of the rotor.

* * * * *